(12) United States Patent
Touchais et al.

(10) Patent No.: US 7,593,477 B2
(45) Date of Patent: Sep. 22, 2009

(54) TRAINING SEQUENCE FOR LINEARIZING AN RF AMPLIFIER

(75) Inventors: Sandrine Touchais, Orsay (FR); Xavier Checoury, Paris (FR)

(73) Assignee: Eads Secure Network, Montigny le Bretonneux (FR)

( * ) Notice: Subject to any disclaimer, the term of this patent is extended or adjusted under 35 U.S.C. 154(b) by 552 days.

(21) Appl. No.: 10/533,860

(22) PCT Filed: Oct. 24, 2003

(86) PCT No.: PCT/FR03/03134

§ 371 (c)(1), (2), (4) Date: May 5, 2005

(87) PCT Pub. No.: WO2004/045179

PCT Pub. Date: May 27, 2004

(65) Prior Publication Data

US 2006/0018400 A1    Jan. 26, 2006

(30) Foreign Application Priority Data

Nov. 5, 2002    (FR) .................................. 02 13817

(51) Int. Cl.
H04K 1/02    (2006.01)
H04L 27/00    (2006.01)
(52) U.S. Cl. ........................ 375/296; 375/295; 375/297; 375/146
(58) Field of Classification Search .................. 375/295, 375/296, 297, 146
See application file for complete search history.

(56) References Cited

U.S. PATENT DOCUMENTS

| | | | | |
|---|---|---|---|---|
| 4,291,277 A | * | 9/1981 | Davis et al. | 330/149 |
| 4,700,151 A | * | 10/1987 | Nagata | 332/123 |
| 5,049,832 A | * | 9/1991 | Cavers | 330/149 |
| 5,066,923 A | | 11/1991 | Gailus et al. | 330/107 |
| 5,148,448 A | * | 9/1992 | Karam et al. | 375/298 |
| 5,507,014 A | * | 4/1996 | Wray et al. | 455/114.3 |
| 5,559,807 A | * | 9/1996 | van den Heuvel et al. | 370/347 |
| 5,699,383 A | * | 12/1997 | Ichiyoshi | 375/297 |

(Continued)

FOREIGN PATENT DOCUMENTS

WO    WO 94/10765    5/1994

OTHER PUBLICATIONS

ISR, for PCT/FR03/03134, issued on Mar. 8, 2004.

*Primary Examiner*—Jason M. Perilla
(74) *Attorney, Agent, or Firm*—McCracken & Frank LLP (57) ABSTRACT

There is disclosed a linearization training sequence that is transmitted by means of a radio frequency transmitter which is comprised in a mobile terminal or a base station of a radiocommunication system and transmits bursts according to a given frame structure. The sequence comprises a given number N of symbols which are part of an alphabet of symbols, N being an integer. At least one given number N1 of symbols of the sequence that is transmitted first is part of a sub-alphabet of symbols, which is contained in the alphabet of symbols, N1 being an integer that is smaller than or equal to N. The sub-alphabet of symbols consists of individual or a combination of symbols that provide the burst within which the sequence is transmitted with a narrower spectrum than the alphabet of symbols as a whole.

22 Claims, 3 Drawing Sheets

U.S. PATENT DOCUMENTS

| | | | |
|---|---|---|---|
| 5,732,333 A * | 3/1998 | Cox et al. | 455/126 |
| 5,748,678 A * | 5/1998 | Valentine et al. | 375/297 |
| 5,760,646 A * | 6/1998 | Belcher et al. | 330/149 |
| 5,867,065 A * | 2/1999 | Leyendecker | 330/149 |
| 5,892,397 A * | 4/1999 | Belcher et al. | 330/149 |
| 5,913,172 A * | 6/1999 | McCabe et al. | 455/503 |
| 5,920,808 A * | 7/1999 | Jones et al. | 455/127.1 |
| 5,923,712 A * | 7/1999 | Leyendecker et al. | 375/297 |
| 5,929,703 A * | 7/1999 | Sehier et al. | 330/149 |
| 5,959,499 A * | 9/1999 | Khan et al. | 330/149 |
| 5,959,500 A * | 9/1999 | Garrido | 330/151 |
| 6,043,707 A * | 3/2000 | Budnik | 330/10 |
| 6,075,411 A * | 6/2000 | Briffa et al. | 330/149 |
| 6,141,390 A * | 10/2000 | Cova | 375/297 |
| 6,320,463 B1 * | 11/2001 | Leva et al. | 330/149 |
| 6,369,648 B1 * | 4/2002 | Kirkman | 330/43 |
| 6,396,350 B2 * | 5/2002 | Nam | 330/297 |
| 6,674,808 B1 * | 1/2004 | Griph et al. | 375/285 |
| 6,680,649 B2 * | 1/2004 | Rydin | 330/149 |
| 6,731,168 B2 * | 5/2004 | Hedberg et al. | 330/149 |
| 6,741,662 B1 * | 5/2004 | Francos et al. | 375/297 |
| 6,771,708 B1 * | 8/2004 | Suga et al. | 375/278 |
| 6,853,246 B2 * | 2/2005 | Bauder et al. | 330/149 |
| 6,885,241 B2 * | 4/2005 | Huang et al. | 330/149 |
| 6,891,902 B2 * | 5/2005 | Talwar et al. | 375/296 |
| 6,928,122 B2 * | 8/2005 | Opas et al. | 375/296 |
| 6,931,080 B2 * | 8/2005 | Giardina et al. | 375/296 |
| 6,985,704 B2 * | 1/2006 | Yang et al. | 455/126 |
| 7,003,051 B2 * | 2/2006 | Francos et al. | 375/296 |
| 7,016,431 B2 * | 3/2006 | Schrader et al. | 375/297 |
| 7,062,233 B2 * | 6/2006 | Huttunen | 455/114.3 |
| 7,085,330 B1 * | 8/2006 | Shirali | 375/296 |
| 7,099,399 B2 * | 8/2006 | McCallister | 375/269 |
| 7,289,773 B2 * | 10/2007 | Braithwaite | 455/91 |
| 7,295,815 B1 * | 11/2007 | Wright et al. | 455/91 |
| 7,312,656 B2 * | 12/2007 | Saed | 330/149 |
| 7,403,573 B2 * | 7/2008 | DeBruyn et al. | 375/297 |
| 7,430,248 B2 * | 9/2008 | McCallister | 375/296 |
| 7,466,197 B2 * | 12/2008 | Benedict et al. | 330/149 |
| 7,479,828 B2 * | 1/2009 | Benedict | 330/149 |
| 2001/0004223 A1 * | 6/2001 | Kim | 330/149 |
| 2002/0016154 A1 * | 2/2002 | Huttunen | 455/63 |
| 2002/0171485 A1 * | 11/2002 | Cova | 330/149 |
| 2003/0031270 A1 * | 2/2003 | Giardina et al. | 375/296 |
| 2003/0035494 A1 * | 2/2003 | Bauder et al. | 375/296 |
| 2003/0063686 A1 * | 4/2003 | Giardina et al. | 375/296 |
| 2003/0072388 A1 * | 4/2003 | Francos et al. | 375/296 |
| 2003/0146787 A1 * | 8/2003 | Hedberg et al. | 330/149 |
| 2003/0156657 A1 * | 8/2003 | Schrader et al. | 375/295 |
| 2003/0156658 A1 * | 8/2003 | Dartois | 375/297 |
| 2003/0179830 A1 * | 9/2003 | Eidson et al. | 375/296 |
| 2003/0184374 A1 * | 10/2003 | Huang et al. | 330/149 |
| 2003/0197558 A1 * | 10/2003 | Bauder et al. | 330/149 |
| 2003/0207680 A1 * | 11/2003 | Yang et al. | 455/341 |
| 2004/0028146 A1 * | 2/2004 | Winkler | 375/260 |
| 2004/0057533 A1 * | 3/2004 | Kermalli | 375/296 |
| 2005/0032472 A1 * | 2/2005 | Jiang et al. | 455/13.4 |
| 2005/0163250 A1 * | 7/2005 | McCallister | 375/296 |
| 2005/0163251 A1 * | 7/2005 | McCallister | 375/296 |
| 2005/0169411 A1 * | 8/2005 | Kroeger | 375/350 |
| 2005/0231279 A1 * | 10/2005 | Moffatt et al. | 330/149 |
| 2006/0008028 A1 * | 1/2006 | Maltsev et al. | 375/297 |
| 2006/0039498 A1 * | 2/2006 | de Figueiredo et al. | 375/297 |
| 2006/0247898 A1 * | 11/2006 | Cha | 702/188 |

* cited by examiner

TRAINING SEQUENCE FOR LINEARIZING AN RF AMPLIFIER

BACKGROUND OF THE INVENTION

1. Technical Field

The present invention relates to the linearization of radiofrequency (RF) power amplifiers. It finds applications, in particular, in the RF transmitters of the mobile terminals of digital radiocommunication systems. It may also be applied in the RF transmitters of base stations in particular during the first start-up of such a station.

2. Related Art

In current digital radiocommunication systems, one seeks to send information with a maximum throughput in a given RF frequency band which is assigned to a transmission channel (hereinbelow radio channel). To do this, the modulations that have been used for a few years comprise a phase or frequency modulation component and an amplitude modulation component.

Moreover, radio channels coexist in a determined frequency band allotted to the system. Each radio channel is subdivided into logical channels by time division. In each time interval (or time slot), a group of symbols called a burst or packet is transmitted.

It is necessary to take care that, at each instant, the power level transmitted in each radio channel does not jam the communications in an adjacent radio channel. Thus, specifications prescribe that the power level of an RF signal transmitted in a determined radio channel be, in an adjacent radio channel, less for example by 60 dB (decibels), than the power level of the RF signal transmitted in said determined radio channel.

It therefore turns out to be necessary that the spectrum of the signal to be transmitted, which results in particular from the type of the modulation employed and the binary throughput, not be deformed by the RF transmitter. In particular, it is necessary that the RF transmitter exhibit a characteristic of output power as a function of input power, which is linear.

However, the radiofrequency power amplifier (hereinafter RF amplifier) present in the RF transmitter has a characteristic that is linear at low output power but nonlinear as soon as the power exceeds a certain threshold. It is also known that the efficiency of the RF amplifier is all the better when working in a zone close to saturation, that is to say in the nonlinear regime. Thus, the need for linearity and the need for high efficiency (to save on battery charge) compel the use of linearization techniques to correct the nonlinearities of the RF amplifier. Two of the techniques most commonly employed are baseband adaptive predistortion and the baseband Cartesian loop.

In the Cartesian loop technique, the signal to be transmitted is generated in baseband in the I and Q format. Additionally, a coupler followed by a demodulator makes it possible to tap off a part of the RF signal transmitted and to transpose it to baseband (downconversion), in the I and Q format. This baseband signal is compared with the baseband signal to be transmitted. An error signal resulting from this comparison drives a modulator, which provides for the transposition to the radiofrequency domain (upconversion). The output signal from the modulator is amplified by an RF amplifier which delivers the RF signal transmitted.

In the baseband adaptive predistortion technique, the signal to be transmitted is generated in baseband, in the I and Q format, and predistorted via a predistortion device. Then, this signal is transposed to the RF domain by virtue of an RF modulator. Next, it is amplified in an RF amplifier. A coupler followed by an RF demodulator make it possible to tap off a part of the RF signal transmitted and to transpose it to baseband, in the I, Q format. This baseband demodulated signal is digitized and compared with the baseband signal to be transmitted. An adaptation of the predistortion coefficients, carried out during a phase of training of the predistortion device, allows the demodulated I and Q format signal to be made to converge to the I and Q format signal to be transmitted.

In both techniques, a part of the signal transmitted is tapped off at the output of the RF amplifier so as to compare it with the signal to be transmitted. As a result, linearity is not obtained immediately but only after a certain time, required for the convergence of the linearization device. The signal transmitted has, during a period corresponding to the phase of training of the linearization device, a spectrum that is widened by the uncorrected nonlinearities. It may not comply with the constraints on the spectrum of the signals transmitted. This remark applies admittedly more to adaptive predistortion than to the Cartesian loop, even if the latter requires, in order to ensure its stability, initial adjustments of phase and of amplitude levels akin to training.

Several procedures have been proposed in the prior art for remedying this problem.

The procedure disclosed in WO 94/10765 relies on the transmission by the transmitters of the system of particular sequences, so-called linearization training sequences, during linearization training phases. More particularly, training sequences are transmitted in an isolated manner in time intervals forming a particular logical channel of the radio channels, which is dedicated solely to linearization. As all the transmitters of the system transmit their respective training sequence at the same time, the communications are not disturbed by interference between the radio channels which may possibly occur at this moment. It is therefore not necessary to prevent interference between the radio channels of the system.

However, this procedure has several drawbacks. Firstly, it requires prior synchronisation of all the transmitters so that the latter transmit their respective linearization training sequence in the logical channel dedicated to linearization. Moreover, no sending of data can occur in the time intervals of this logical channel. Furthermore, at the start of each transmission or in the event of a change of radio channel, the transmitter is compelled to wait for the next time interval of the logical channel dedicated to linearization, unless the system is made considerably more complex. This is why the temporal spacing between two time intervals of said logical channel cannot exceed a second, so as to guarantee a certain quality of service (QoS). This technique is therefore very prejudicial to the spectral efficiency of the radiocommunication system. Finally, since no particular precaution is taken to avoid out-of-band transmission during the linearization training phases, this technique may generate interference in respect of the transmitters of the other radiocommunication systems, which do not conform therewith.

Another procedure, disclosed in U.S. Pat. No. 5,748,678, provides for the use during the linearization training phases of a second modulator having half the throughput of the modulator normally used for the transmitting of useful data. This second modulator generates a signal which possesses the same depth of amplitude modulation but a spectral width that is divided by two with respect to the signals transmitted outside of the linearization training phases. This makes it possible to avoid jamming the adjacent radio channels by the signals uncorrected for the nonlinearities which are transmitted during the linearization training phases.

However, this procedure is fairly complex to implement since it requires a second modulator, as well as associated filters or the use of adaptive filters. This second modulator serves only during the linearization training phases, that is to say for a very small fraction of the time. Specifically, when the amplifier has been linearized initially, it suffices to correct any drifting of its characteristics. The linearization devices of the type alluded to in the introduction may deal therewith in the course of the transmitting of useful data (at the normal throughput). The overhead related to this corresponding second modulator is therefore hardly justified.

BRIEF DESCRIPTION OF THE INVENTION

A first aspect of the invention relates to a method of training a device for linearizing a radiofrequency amplifier which is included within a radiofrequency transmitter of a first equipment of a radiocommunication system, which transmitter is adapted for transmitting bursts according to a determined frame structure, each burst comprising symbols belonging to a determined alphabet of symbols. The method comprises the steps of:

a) generating a linearization training sequence comprising a determined number N of symbols, where N is a determined integer;

b) transmitting the linearization training sequence by means of the transmitter in at least certain of the bursts transmitted by the transmitter;

c) comparing the linearization training sequence transmitted with the linearization training sequence generated so as to train the linearization device.

In embodiments of the method, at least a determined number N1 of symbols of the linearization training sequence sent first, where N1 is a determined integer less than or equal to N, belong to a subalphabet of symbols included within the alphabet of symbols, the subalphabet of symbols consisting of symbols which, in isolation or combination, give the burst a narrower spectrum than the alphabet of symbols as a whole.

By subalphabet is understood to mean a part of the alphabet considered. Stated otherwise, if the alphabet comprises a determined number M of symbols (M-ary alphabet), the subalphabet comprises only a determined number M1 of these symbols (M1-ary subalphabet) where M and M1 are integers such that M1 is less than M. The M1 symbols of the subalphabet are chosen in such a way as to give the RF signal which is transmitted a narrower spectrum than that given by the M symbols of the alphabet as a whole.

The first equipment may be a mobile terminal or a base station of the radiocommunication system.

A second aspect of the invention relates to a device for training a device for linearizing a radiofrequency amplifier which is included within a radiofrequency transmitter of a first equipment of a radiocommunication system, which transmitter is adapted for transmitting bursts according to a determined frame structure, each burst comprising symbols belonging to a determined alphabet of symbols. The device comprises:

a) means for generating a linearization training sequence comprising a determined number N of symbols, where N is a determined integer;

b) means for transmitting the linearization training sequence by means of the transmitter in at least certain of the bursts transmitted by the transmitter;

c) means for comparing the linearization training sequence transmitted with the linearization training sequence generated so as to train the linearization device.

In embodiments of the device, at least a determined number N1 of symbols of the linearization training sequence sent first, where N1 is a determined integer less than or equal to N, belong to a subalphabet of symbols included within the alphabet of symbols, the subalphabet of symbols consisting of symbols which, in isolation or combination, give the burst a narrower spectrum than the alphabet of symbols as a whole.

A third aspect of the invention relates to a mobile terminal of a radiocommunication system, comprising a radiofrequency transmitter having a radiofrequency amplifier and a device for linearizing the radiofrequency amplifier, and which further comprises a device for training the linearization device according to the second aspect.

A fourth aspect of the invention relates to a base station of a radiocommunication system comprising a radiofrequency transmitter having a radiofrequency amplifier and a device for linearizing the radiofrequency amplifier, and which further comprises a device for training the linearization device according to the third aspect.

A fifth aspect relates to a linearization training sequence intended to be transmitted by means of a radiofrequency transmitter of a mobile terminal or of a base station of a radiocommunication system, which transmitter is adapted for transmitting bursts according to a determined frame structure. The sequence comprises a determined number N of symbols, where N is a determined integer, these symbols belonging to a determined alphabet of symbols.

In embodiments of the sequence, at least a determined number N1 of symbols of the linearization training sequence sent first, where N1 is a determined integer less than or equal to N, belong to a subalphabet of symbols included within the alphabet of symbols, the subalphabet of symbols consisting of symbols which, in isolation or combination, give the burst in which the linearization training sequence is transmitted a narrower spectrum than the alphabet of symbols as a whole.

The invention thus uses a particular training sequence which allows the RF signal transmitted to preserve, during the linearization training phase, a spectral width compatible with the sought-after performance without any particular constraint on the instants at which this training is carried out or on the complexity of the transmitter. The binary throughput during the linearization training phase may be the same as that outside of this phase.

DESCRIPTION OF PREFERRED EMBODIMENTS

Figure 1:
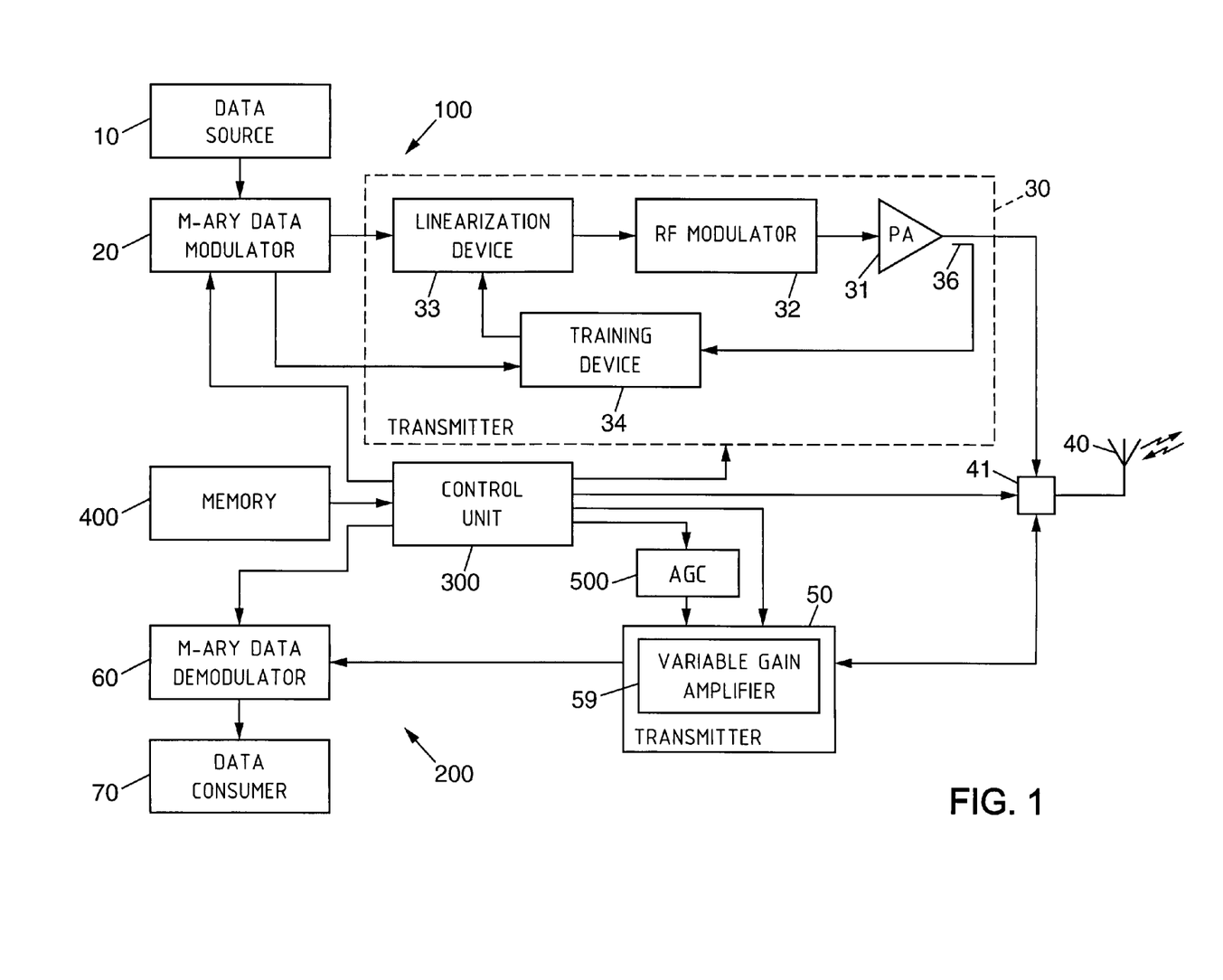
FIG. 1 is a schematic diagram of an exemplary mobile terminal according to the invention.

Represented diagrammatically in FIG. 1 are the means of an exemplary mobile terminal according to the invention.

Such a mobile terminal belongs for example to a radiocommunication system which additionally comprises a fixed network having base stations.

The terminal comprises a transmit chain 100, a receive chain 200, a control unit 300, a permanent memory 400, as well as an automatic gain control device 500 (AGC) associated with an RF receiver of the receive chain 200.

The transmit chain 100 comprises a useful-data source 10, for example a speech coder delivering voice-coding data. The source 10 is coupled to an M-ary data modulator 20 which provides for the baseband modulation of the data to be transmitted according to a modulation with M distinct states, where M is a determined integer. The binary data which it receives from the source 10 are translated by the modulator 20 into symbols belonging to an M-ary alphabet, that is to say comprising M distinct signals. The output of modulator 20 is coupled to the input of a radiofrequency transmitter 30. On the basis of the string of symbols received, the transmitter 30 produces an RF signal suitable for radio transmission via an antenna or a cable. The output of the transmitter 30 is coupled to a transmit/receive antenna 40 via a switch 41. Thus the RF signal produced by the transmitter is transmitted on the radio channel associated with the transmitter.

The receive chain 200 comprises a radiofrequency receiver 50 which is coupled to the antenna 40 via the switch 41, so as to receive an RF signal. The receiver 50 provides for the transposition from the RF domain to the baseband (downconversion). For this purpose, it comprises a variable gain amplifier 59 the function of which is to compensate for the power variations (which may be fast) on the antenna 40 so that the remainder of the receive chain processes a signal having a substantially constant power level, thereby ensuring good performance. The receive chain 200 also comprises an M-ary data demodulator 60, coupled to the receiver 50. The data demodulator 60 provides in baseband for the demodulation of the data of the signal received, that is to say the operation inverse to that provided by the modulator 20. Finally, the receive chain 200 comprises a data consumer device 70, such as a speech decoder, which is coupled to the demodulator 60. This device receives as input the binary data delivered by the demodulator 60.

The unit 300 is for example a microprocessor or a microcontroller which provides for the management of a mobile terminal. In particular, it controls the data modulator 20, the data demodulator 60, the transmitter 30 and the switch 41. It also generates signaling data which are supplied to the modulator 20 so as to be transmitted in appropriate signaling logical channels. Conversely, the unit 300 receives from the data demodulator 60 signaling data dispatched by the fixed network in appropriate signaling logical channels, in particular synchronization information and operating commands.

The memory 400 is for example a ROM ("Read Only Memory"), EPROM ("Electrically Programmable ROM") or Flash-EPROM memory, in which are stored data which are used for the operation of the mobile terminal. These data comprise in particular a linearization training sequence to which we shall return later.

An exemplary embodiment of the transmitter 30 will now be described. In this example, the transmitter 30 comprises a radiofrequency power amplifier 31, a radiofrequency modulator 32 which provides for the transposition from baseband to the radiofrequency domain (upconversion), a linearization device 33, a training module 34 associated with the linearization device.

The output of the power amplifier 31 delivers the RF signal to be transmitted. This is why this output is coupled to the antenna 40 via the switch 41. The input of the power amplifier 31 receives a radiofrequency signal delivered by the output of the radiofrequency modulator 32. The input of the latter is coupled to the output of the data modulator 20 so as to receive the string of symbols forming the baseband signal to be transmitted, through the linearization device 33. The latter comprises for example a predistortion device comprising a pallet ("look-up table") which translates each value of the signal to be transmitted into a predistorted value. As a variant or as a supplement, the device 33 can also comprise means of amplitude slaving of the output signal from the transmitter 30.

The training module 34 carries out the training of the linearization device 33 as a function of an input signal which reflects the RF signal delivered by the output of the power amplifier 31. For this purpose, the module 34 receives a part of this RF signal, which part is tapped off at the output of the power amplifier 31 by means of a coupler 36. As needed, the module 34 provides for the baseband return of the RF signal thus tapped off. Although being represented entirely inside the transmitter 30, the module 34 can, at least in part, be implemented by means belonging to the control unit 300, in particular software means.

Finally, the automatic gain control device 500 makes it possible, under the control of the control unit 300 to dynamically vary the gain of the variable gain amplifier 59 of the RF receiver 50, as a function of information which is received from the fixed network, according to a method known per se. By virtue of this method, the fixed network base station with which the terminal is communicating, transmits at determined instants a determined sequence, called the AGC sequence. This sequence is known to and recognizable by the mobile terminal. It allows the latter to measure the power of the signal received from the base station and to deduce therefrom a control for the gain of the amplifier 59. This method is implemented in the mobile terminal by the device 500 under the control of the unit 300.

According to a symmetric method, provision is made for the transmitter 30 to transmit an AGC sequence, so as to allow dynamic control, by the base station, of the gain of a variable gain amplifier included in an RF receiver of the base station. This sequence is known to and recognizable by the base station. It allows the base station to measure the power of the signal received from the mobile terminal and to deduce therefrom a control for the gain of the variable gain amplifier of the RF receiver of the base station.

In an exemplary implementation of the invention, the data modulator 20 applies a so-called F4FM modulation (standing for "Filtered 4-state Frequency Modulation"), which is a proprietary modulation but is undergoing standardization at the TIA (Telecommunications Industry Association). This is a 4-state modulation or quaternary modulation, that is to say an M-ary modulation where here M is equal to 4. When the throughput of the modulator 20 is equal to 8 kilo-symbols/s, the sending of 8 symbols lasts 1 ms (millisecond). Stated otherwise, the sending of a symbol lasts 125 µs (microsecond).

Figure 2:
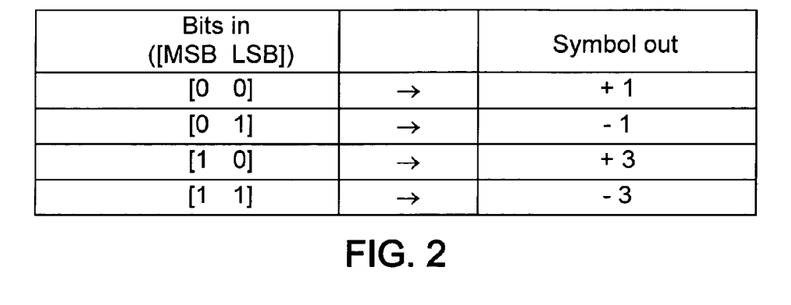
FIG. 2 is a table illustrating an exemplary data modulation based on a quaternary alphabet of symbols.

The table of FIG. 2 gives the correspondence between binary data and symbols, which is applied by the F4FM modulation. Each symbol corresponds to two data bits. The alphabet of symbols is composed of four symbols denoted −3, −1, +1 and +3. This quaternary alphabet is denoted {−3, −1, +1, +3}. When a signal to be transmitted is generated from the symbols of this alphabet, the RF signal has a spectrum of determined width. Among these symbols, the symbols denoted −1 and +1 form a subalphabet which, when it alone is used for the generation of the signal to be transmitted, gives the corresponding RF signal a spectrum of reduced width with respect to said determined width. This subalphabet is denoted {−1, +1}. This is an M1-ary subalphabet, with M1=2, all of whose symbols belong to the complete alphabet {−3, −1, +1, +3}. According to a characteristic of the F4FM modulation, the symbols of the subalphabet {−1, +1} are also those which induce the lowest amplitude modulation depth.

The radiofrequency modulator 32 provides for the transposition of the signal to be transmitted onto a carrier frequency at around 400 MHz (megahertz) or around 800 MHz, in a radio channel of width equal for example to 8 kHz (kilohertz). The various radio channels of the system are spaced apart for example by 12.5 kHz. Each radio channel is subdivided into traffic logical channels or signaling logical channels by time division. In each time interval, a burst is transmitted according to a determined frame structure which it is not necessary to detail here.

The manner of operation of the mobile terminal during a phase of training, by the device 34, of the linearization device 33 will now be described. Although it will not be mentioned each time in what follows, it is of course understood that the terms "training phase" and the terms "training sequence" refer to the training of the linearization device 33 performed by the training device 34 under the control of the unit 300.

The method of training the device 33 comprises a step consisting in generating a training sequence comprising a determined number N of symbols, where N is an integer. This step is carried out by the data modulator 20 under the control of the control unit 300. For this purpose, the unit 300 reads a corresponding sequence of 2×N bits in the memory 400.

Next, still under the control of the unit 300, the training sequence is transmitted by means of the transmitter 30 in at least certain of the bursts transmitted by the latter, according to the frame structure of the system.

The training device 34 thus obtains the training sequence transmitted and compares it with the training sequence generated, and performs actions accordingly such as adaptations of predistortion coefficients or the like of the linearization device 33, according to a specified training algorithm. This algorithm may be adaptive. One speaks of teaching to designate these operations.

Figure 3:
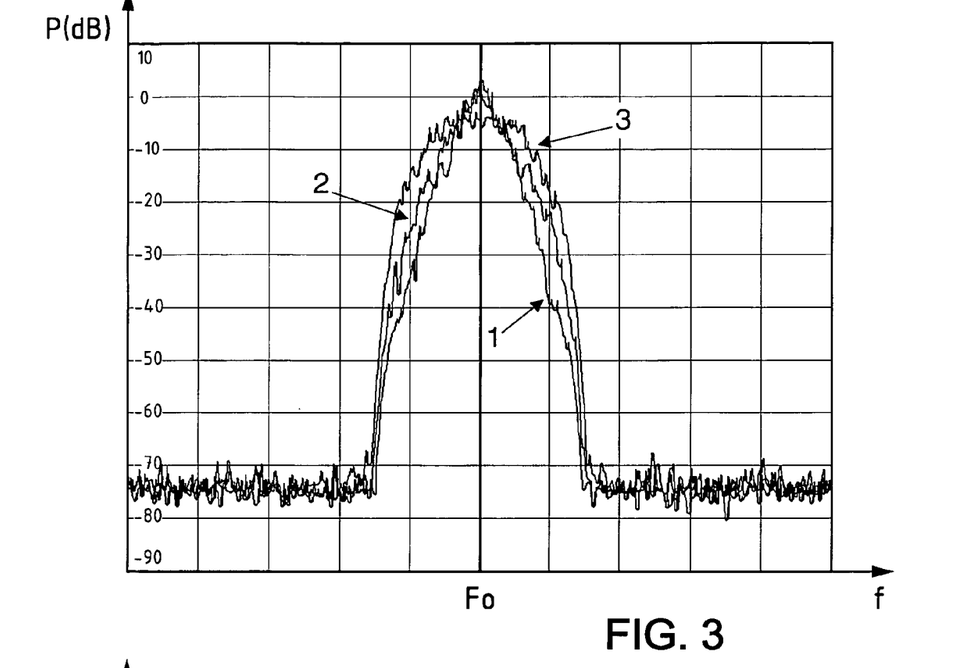
FIG. 3 and FIG. 4 are graphs illustrating the effect of the choice of the symbols of the training sequence on the spectrum of the corresponding RF signal respectively at the input and at the output of the RF amplifier.

Represented in the graph of FIG. 3 is the spectrum of a burst transmitted in a determined radio channel, outside of the training phase, in three different cases. In the first case, corresponding to curve 1, only the symbols of the subalphabet {−1, +1} are used. In the second case, corresponding to curve 2, a majority of the symbols used belong to the subalphabet {−1, +1}, the others belonging to the alphabet {−3, −1, +1, +3} excluding the subalphabet {−1, +1} (that is to say to the subalphabet {−3, +3} formed of the symbols −3 and +3). Finally, in the third case, corresponding to curve 3, the symbols are distributed substantially uniformly in the complete alphabet {−3, −1, +1, +3}. It is observed that the spectrum is all the narrower the higher the number of symbols which belong to the subalphabet {−1, +1}. In each case, the spectrum is centred on the central frequency Fo of the radio channel.

Figure 4:
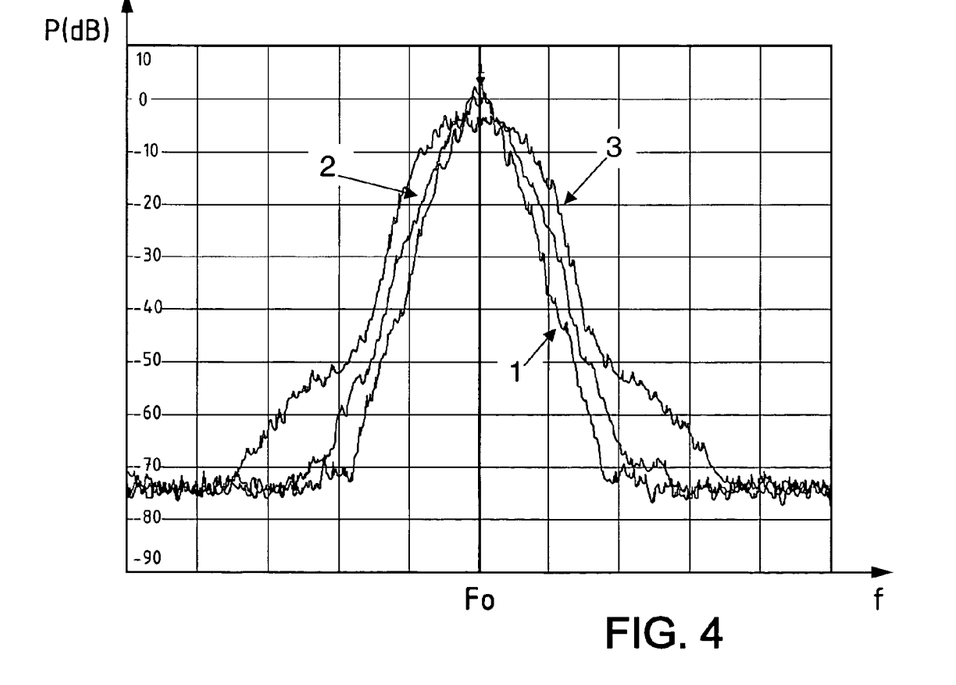

In the graph of FIG. 4, the same curves correspond to measurements performed at the output of the nonlinearized power amplifier 31, that is to say for example at the start of the training phase. The above observation is still valid. Furthermore, one also observes, on comparing the two figures, that in each case the spectrum is wider in FIG. 4 than in FIG. 3. This extends from the nonlinearities of the radiofrequency transmitter 30, in particular the power amplifier 31. This widening of the spectrum may imply the jamming of the adjacent radio channels, during the training phase.

As a result, in order to comply with the spectral constraints during the training phase, a first part at least of the training sequence is advantageously generated from the subalphabet {−1, +1}. In this way, the corresponding RF signal exhibits a spectrum of minimum width. When the system is properly dimensioned, this makes it possible not to disturb the adjacent radio channels during the training phase and in particular during the initial time span where the training algorithm has not yet converged.

The sequence which gives such a spectrum is obtained by simulation or by measurement of the entire transmit chain. It may be, as in the example considered here, that this sequence implies that the amplitude modulation depth is also reduced. It may even be that this reduction has adverse effects on the results of the linearization algorithm and that the sequence chosen is thus not suitable. This is why it may be necessary to add a constraint on the amplitude modulation depth as regards the choice of the training sequence, so as to obtain a compromise between the spectral widening due to the nonlinearities of the power amplifier (to be minimized) and the amplitude modulation depth induced by this sequence (to be maximized). These constraints are variable as a function of the power amplifier used in the transmit chain. A possible procedure whereby this sequence can be chosen is to commit to a digital optimization on the choice of N symbols of the sequence. The transmit chain is taken with all its defects without particular linearization. This sequence generally being short (of the order of about ten symbols), the optimization may be an exhaustive search for the N symbols making it possible to comply with the constraints desired both on the spectral width and on the amplitude modulation depth.

It is also possible to envisage alterations in the value of the amplitude modulation depth in the course of the training phase (between the start and the end of the training sequence), in the case where the training algorithm is adaptive. Specifically, the disturbances engendered by the spectral widening of the signal decrease alongside the convergence of the algorithm, and it then becomes possible to relax the spectral constraint slightly so as to increase the amplitude modulation depth of the RF signal transmitted.

In an example, if one chooses the N1 symbols transmitted first by selecting them within the subalphabet {−1, +1}, it is possible to choose the N2 symbols transmitted last in such a way that at least certain of them belong to the alphabet of symbols {−3, −1, +1, +3} excluding said subalphabet of symbols {−1, +1}, that is to say to the complementary subalphabet {−3, +3}, where N1 and N2 are integers less than N such that N1 and N2 are less than or equal to N. During the transmission of these N2 other symbols, that is to say after having operated the algorithm for training the linearization device 33 on the N1 symbols transmitted first, the transmit chain is already linearized approximately. The linearization is admittedly not total but then it makes it possible to use other symbols generating an RF signal of larger amplitude excursion while complying with the spectral width constraints.

Preferably, matters may be contrived such that a majority or even the totality of these N2 other symbols belongs to the subalphabet {−3, +3} which, according to a property of F4FM modulation, produce a more significant amplitude modulation depth. In the case of another modulation, it may be preferable to tend to a substantially uniform distribution of the symbols in the complete alphabet.

In an example, N1+N2=N. Of course, N1+N2 may be less than N, thereby making it possible to envisage other symbols transmitted between said N1 symbols transmitted first and said N2 symbols transmitted last, by producing intermediate effects in terms of spectral width and amplitude modulation depth.

It may be noted that for any modulation it is possible to find a signal sequence of fixed length N whose characteristics satisfy imposed constraints in terms of spectral width, amplitude modulation depth, and/or others.

It may also be noted that the convergence of the known algorithms for training linearization devices is fairly fast. It follows that an exhaustive search for the optimal sequence by computer-based simulation may be performed without any problem.

Figure 5:
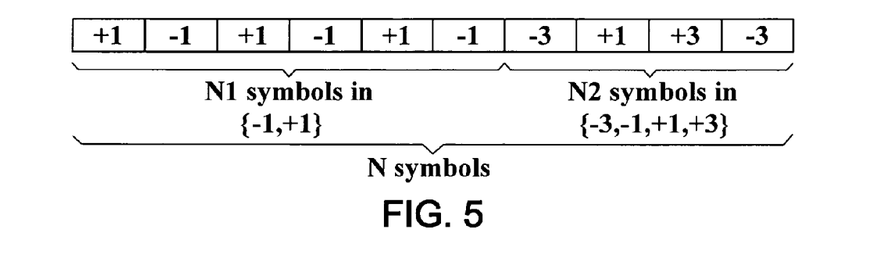
FIG. 5 is a diagram illustrating an exemplary linearization training sequence according to the invention.

The diagram of FIG. 5 illustrates an exemplary training sequence according to the principles presented hereinabove. In this example, the complete alphabet of symbols is the quaternary alphabet {−3, −1, +1, +3} of the F4FM modulation. Stated otherwise M is equal to 4. Additionally, M1 is equal to 2, the subalphabet giving the RF signal a reduced spectrum being {−1, +1}, N is equal to 10, N1 is equal to 6, and N2 is equal to 4. The N1 symbols transmitted first are for example the symbols +1, −1, +1, −1, +1, and −1, successively in this order. The signal transmitted then has a spectrum of minimum width, the amplitude modulation depth remains limited since not all the symbols of the quaternary alphabet are used. In order to take account of the actual amplitude modulation depth of a sequence of useful data, for the convergence of the training algorithm, it suffices to slightly widen the spectrum over the end of the training sequence and to choose for example the N2 symbols transmitted last in the complete alphabet. The N2 symbols transmitted last are for example the symbols −3, +1, +3, and −3, successively and in this order. In this example, the complete sequence is therefore formed of the symbols +1, −1, +1, −1, +1, −1, −3, +1, +3, and −3 successively and in this order.

Training phases may be performed periodically or in some other fashion. Other constraints may have to be taken into account after the initial training phase, when it is entirely suitable to correct drifting of the transmitter. The training sequence may therefore alter both in content and in length. The number N is therefore not necessarily fixed from one transmission of the training sequence to another. If an increase in the size of the sequence poses problems (for example if the frame structure is fairly inflexible), then the size N of the sequence can be fixed and just its content can be modified as a function of the alterations in the constraints on the system.

Figure 6:
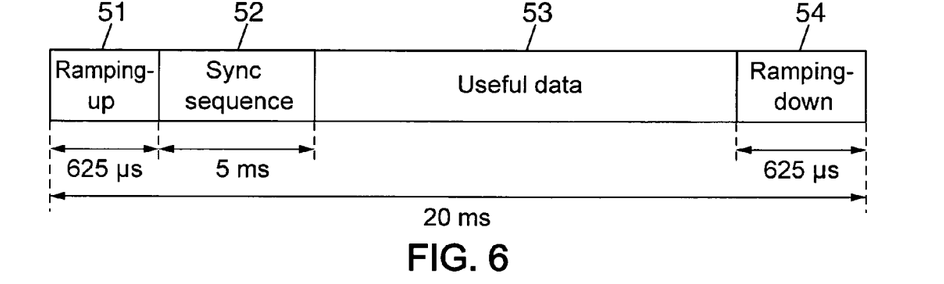
FIG. 6 and FIG. 7 are diagrams illustrating exemplary bursts transmitted by the mobile terminal, able to incorporate a linearization training sequence according to the invention.

The diagram of FIG. 6 illustrates an exemplary burst. In this example, the burst has a duration equal to 20 ms. It comprises firstly a ramping-up 51 of 625 µs, comprising five padding symbols, to ensure the power rise. The expression padding symbols is understood to mean that the binary data sent in this ramping-up are padding bits, that is to say for example a string of 0s. It next comprises a sequence of synchronization data 52 whose duration is equal to around 5 ms. Next, it comprises a sequence of useful data 53. The useful data may be voice-coding data or more generally traffic data, or signaling data depending on whether the burst is transmitted on a traffic logical channel or on a signaling logical channel, respectively. It finally comprises a ramping-down 54, again having five padding symbols for the power drop. Optionally, a guard time is moreover envisaged after the transmission of a burst, so as to guarantee the return to reception of the transmitter.

In one embodiment, the training sequence may replace the useful data of the bursts inside which it is transmitted.

So as not to make the frame structure overly complex, and in particular to avoid having to reserve a specific time interval for the training of the linearization device 33, the space occupied by the linearization sequence may take up only part of the useful data of a burst. This characteristic makes it possible to be able to transmit useful data rapidly in the reminder of the burst without having to wait for the following time interval.

Other embodiments are conceivable. Specifically, in any frame structure provision is made to transmit isolated bursts, in particular at each change of logical channel (occurring in particular at each turn around, that is to say switchover from a receive phase to a transmit phase of the terminal), with each change of RF frequency (when a frequency jump functionality is implemented by the system), with each change of transmission power rating, or else in other particular cases that would take too long to detail here.

Figure 7:
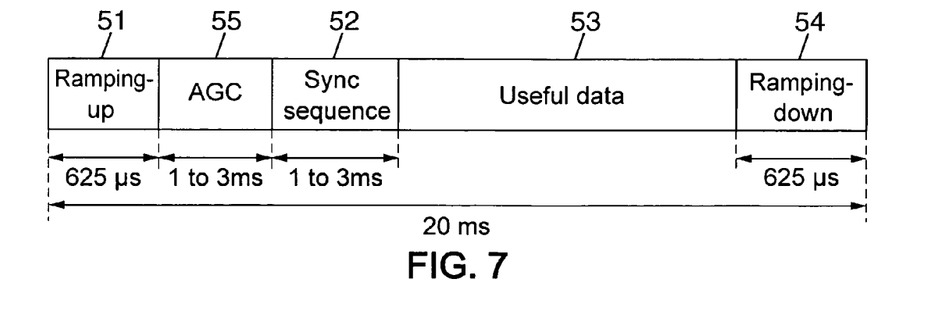

FIG. 7 shows an example of an isolated frame such as this comprising, before the synchronization sequence 52, an AGC sequence referenced 55 which is transmitted by a first item of equipment (mobile terminal or base station) so as to allow the dynamic control, by a second item of equipment respectively base station or mobile terminal with which the first item of equipment is communicating, of the transmission power of its receiver (see above). In this example, the sequence 52 and the sequence 55 each last only 1 to 3 ms. The other parts of the burst are unchanged with respect to the burst of FIG. 6. The sequence of useful data 53 may sometimes be shorter than in the case of a normal burst according to FIG. 6.

In one particularly advantageous embodiment, part of these isolated bursts is used to allow the device 34 for training the radiofrequency transmitter 32 to execute an algorithm for training the linearization device 33. In the example of FIG. 7, the linearization sequence is for example included in the aforesaid AGC sequence.

It is thus possible to use the time required for the transmission of the training sequence for other ends such as for example the tuning of the AGC at reception, according to the method alluded to above in regard to the diagram of FIG. 1. Advantageously, the value of the symbols of the AGC sequence is not subject to any constraint (the AGC sequence simply has to be known to the fixed network). There is therefore complete freedom in choosing the symbols of the sequence, or at least part of the symbols of the sequence, in such a way that these symbols form a satisfactory training sequence.

The recurrence of the AGC sequence is adapted to the needs of the training of the linearization device 33. Specifically, the AGC sequence as the training sequence are preferably transmitted at the start of a frame, and then upon a change of logical channel, upon a change of RF frequency and/or upon a change of power rating. This is why it is particularly advantageous to combine these sequences (these sequences forming just one single sequence, or one of them being included in the other), and to transmit them preferably as indicated hereinabove.

The AGC sequence is situated as near as possible to the signal power ramping-up, for example, just after this ramping. In this way, the training of the linearization device may be carried out as quickly as possible and thus disturb transmission for the least possible time.

In all the embodiments, it is preferable for the length of the training sequence to be such that it does not occupy too large a portion of the burst so as to keep a maximum of symbols for the broadcasting of useful information. This duration obviously depends on the sought-after accuracy of the training algorithm but a compromise between accuracy and duration often turns out to be necessary in order to preserve a maximum of useful information in the burst. A reasonable compromise is achieved when it represents around 5% of the total duration of the burst. In the case of a 20 ms burst transmitted at a binary rate of 8 ksymbols/s, the duration of a training sequence of N=10 symbols is thus equal to 1.25 ms, i.e. 6.25% of the total duration of the frame.

The invention claimed is:

1. A method of training a device for linearizing a radiofrequency amplifier which is included within a radiofrequency transmitter of a first equipment of a radiocommunication system, which transmitter is adapted for transmitting bursts according to a determined frame structure, each burst comprising symbols belonging to a determined alphabet of symbols, the method comprising the steps consisting in:
   a) generating a linearization training sequence comprising a determined number N of symbols, where N is a determined integer;
   b) transmitting the linearization training sequence by means of the transmitter in at least certain bursts transmitted and thereby generating an aggregate linearization transmission spectrum of the N symbols of the linearization training sequence;
   c) comparing the linearization training sequence transmitted with the linearization training sequence generated so as to train said linearization device, wherein a determined number N1 of symbols of the linearization training sequence sent first belong to a subalphabet of symbols included within said alphabet of symbols, said subalphabet of symbols consisting of symbols which, when considering an aggregate spectrum of the transmission of the N1 symbols, produce a narrower spectrum respective to the aggregate linearization spectrum of the N symbols, and wherein N1 is a determined integer greater than one and the N symbols contain at least one symbol outside the subalphabet of symbols.

2. The method of claim 1, wherein the linearization training sequence comprises a determined number N2 of other symbols transmitted last, at least certain of which belong to the alphabet of symbols excluding said subalphabet of symbols, or N2 is an integer less than N.

3. The method of claim 2, wherein a majority or the totality of said N2 other symbols transmitted last belong to the alphabet of symbols excluding said subalphabet of symbols.

4. The method of claim 2, wherein N1+N2=N.

5. The method of claim 1, according to which the number N is fixed.

6. The method of claim 1, according to which the linearization training sequence occupies only a part of the bursts in which it is transmitted.

7. The method of claim 6, wherein the linearization training sequence occupies around 5% of the duration of any burst in which it is transmitted.

8. The method of claim 1, wherein the linearization training sequence is transmitted at the start of the determined frame structure.

9. The method of claim 1, wherein the linearization training sequence is further transmitted during a change of logical channel, a change of frequency and/or a change of power rating of the first equipment.

10. The method of claim 1, wherein the training sequence is included within or includes a sequence of symbols that is designed to allow dynamic control of a gain of a variable-gain amplifier of a radiofrequency receiver of a second item of equipment of the radiocommunication system with which said first equipment communicates.

11. A device for training a device for linearizing a radiofrequency amplifier of a radiofrequency transmitter which is included within a first equipment of a radiocommunication system, which transmitter is adapted for transmitting bursts according to a determined frame structure, each burst comprising symbols belonging to a determined alphabet of symbols, the device comprising:
   a) means for generating a linearization training sequence comprising a determined number N of symbols, where N is a determined integer;
   b) means for transmitting the linearization training sequence by means of the transmitter in at least certain of the bursts transmitted by the transmitter;
   c) means for comparing the linearization training sequence transmitted with the linearization training sequence generated so as to train said linearization device,
   wherein a determined number N1 of symbols of the linearization training sequence sent first belong to a subalphabet of symbols included within said alphabet of symbols, said subalphabet of symbols consisting of symbols which, when considering an aggregate spectrum of the transmission of the N1 symbols, produce a narrower transmission spectrum respective to the aggregate linearization spectrum of the N symbols, and wherein N1 is a determined integer greater than one and the N symbols contain at least one symbol outside the subalphabet of symbols.

12. The device of claim 11, wherein the linearization training sequence comprises a determined number N2 of other symbols transmitted last, at least certain of which belong to the alphabet of symbols excluding said subalphabet of symbols, or N2 is an integer less than N.

13. The device of claim 12, wherein a majority or the totality of said N2 other symbols transmitted last belong to the alphabet of symbols excluding said subalphabet of symbols.

14. The device of claim 12, wherein N1+N2=N.

15. The device of claim 11, wherein the number N is fixed.

16. The device of claim 11, wherein the linearization training sequence occupies only a part of the bursts in which it is transmitted.

17. The device of claim 16, wherein the linearization training sequence occupies around 5% of the duration of any burst in which it is transmitted.

18. The device of claim 11, wherein the means for transmitting are adapted for transmitting the linearization training sequence at the start of the determined frame structure.

19. The device of claim 11, wherein the means for transmitting are adapted for transmitting the linearization training sequence during a change of logical channel, a change of frequency and/or a change of power rating of the first equipment.

20. The device of claim 11, wherein the training sequence is included within or includes a sequence of symbols that is designed to allow dynamic control of a gain of a variable-gain amplifier of a radiofrequency receiver of a second wherein equipment of the radiocommunication system with which said first item of equipment communicates.

21. A mobile terminal of a radiocommunication system, comprising a radiofrequency transmitter having a radiofrequency amplifier and a device for linearizing the radiofrequency amplifier, further comprising a device for training the linearization device as claimed in claim 11.

22. A base station of a radiocommunication system comprising a radiofrequency transmitter having a radiofrequency amplifier and a device for linearizing the radiofrequency amplifier, further comprising a device for training the linearization device as claimed in claim 11.

* * * * *